United States Patent
Cavaliere et al.

(10) Patent No.: US 11,206,085 B2
(45) Date of Patent: Dec. 21, 2021

(54) CHROMATIC DISPERSION COMPENSATION

(71) Applicant: Telefonaktiebolaget LM Ericsson (publ), Stockholm (SE)

(72) Inventors: Fabio Cavaliere, Pisa (IT); Michele Midrio, Pisa (IT); Marco Romagnoli, Pisa (IT); Vito Sorianello, Pisa (IT)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 667 days.

(21) Appl. No.: 16/078,126

(22) PCT Filed: Jan. 3, 2017

(86) PCT No.: PCT/EP2017/050091
§ 371 (c)(1),
(2) Date: Aug. 21, 2018

(87) PCT Pub. No.: WO2017/144187
PCT Pub. Date: Aug. 31, 2017

(65) Prior Publication Data
US 2021/0194587 A1 Jun. 24, 2021

Related U.S. Application Data

(60) Provisional application No. 62/300,359, filed on Feb. 26, 2016.

(51) Int. Cl.
*H04B 10/2513* (2013.01)
*H04B 10/2525* (2013.01)
*H04B 10/2569* (2013.01)

(52) U.S. Cl.
CPC ... *H04B 10/25133* (2013.01); *H04B 10/2525* (2013.01); *H04B 10/2569* (2013.01)

(58) Field of Classification Search
None
See application file for complete search history.

(56) References Cited

U.S. PATENT DOCUMENTS 5,822,100 A * 10/1998 Robinson ........... H04B 10/2569
398/147
2001/0036332 A1* 11/2001 Brennan, III ......... H01S 5/0622
385/15

(Continued)

FOREIGN PATENT DOCUMENTS

| DE | 199 50 132 A1 | 4/2001 | |
| DE | 19950132 A1 * | 4/2001 | ....... H04B 10/25133 |
| EP | 2 937 721 A1 | 10/2015 | |

OTHER PUBLICATIONS

Godard, "Passband Timing Recovery in an All-Digital Modem Receiver", IEEE Transactions on Communications, vol. COM-26, No. 5, May 1978, pp. 517-523 (Year: 1978).*

(Continued)

*Primary Examiner* — Darren E Wolf
(74) *Attorney, Agent, or Firm* — Baker Botts L.L.P.

(57) ABSTRACT

A device (10;150;200) is configured to receive an optical signal. The device comprises a dispersion compensator (210a) comprising a plurality of optical dispersion compensator units (220). Each optical dispersion compensator unit comprises a plurality of delay elements (20;40). The dispersion compensator (210a) is configured to selectively activate one or more of the optical dispersion compensator units (220). The dispersion compensator (210a) is configured to compensate for dispersion of the optical signal with the activated one or more optical dispersion compensator unit (200).

20 Claims, 7 Drawing Sheets

(56) References Cited

U.S. PATENT DOCUMENTS

| | | | | |
|---|---|---|---|---|
| 2003/0152322 | A1* | 8/2003 | Smith | H04B 10/2569 |
| | | | | 385/27 |
| 2004/0208619 | A1 | 10/2004 | Li et al. | |
| 2005/0041970 | A1* | 2/2005 | Harai | H04Q 11/0005 |
| | | | | 398/51 |
| 2007/0092259 | A1* | 4/2007 | Bontu | H04B 10/6162 |
| | | | | 398/147 |
| 2008/0232804 | A1* | 9/2008 | Absillis | H04J 3/14 |
| | | | | 398/71 |
| 2009/0238578 | A1* | 9/2009 | Taylor | H04B 10/6972 |
| | | | | 398/147 |
| 2010/0021179 | A1* | 1/2010 | Kikuchi | H04B 10/6161 |
| | | | | 398/183 |
| 2010/0189445 | A1* | 7/2010 | Nakashima | H04B 10/65 |
| | | | | 398/152 |
| 2011/0200339 | A1* | 8/2011 | Komaki | H04B 10/6971 |
| | | | | 398/208 |
| 2012/0263456 | A1* | 10/2012 | Tanaka | H04B 10/5055 |
| | | | | 398/25 |
| 2015/0311978 | A1* | 10/2015 | Chen | G02B 6/29394 |
| | | | | 398/147 |

OTHER PUBLICATIONS

Hauske, "Precise Robust and Least Complexity CD estimation" OSA/OFC/NFOEC 2011, Mar. 2011 (https://www.researchgate.net/publication/241183585_Precise_robust_and_least_complexity_CD_estimation) (Year: 2011).*

An Integrated Tunable Chromatic Dispersion Compensator For 40 GB/s NRZ and CSRZ by C.K. Madsen et al.; Optical Society of America—2000.

Multi-Stage Ring Resonator All-Pass Filters for Dispersion Compensation by Chinda Chaichuay et al.; Optical Applicata, vol. XXXIX, No. 2—2009.

Double-Pass PMF-Based Optical Circuit Enhancing 40 Gbit/s Chromatic Dispersion Tolerance by A. D-Errico and E. Ciarmella; ECOC 2008, Brussels, Belgium—Sep. 21-25, 2008.

Multistage Dispersion Compensator Using Ring Resonators by C.K. Madsen et al., Nov. 15, 1999, vol. 24, No. 22/Optics Letters.

International Search Report for International application No. PCT/EP2017/050091—dated Mar. 15, 2017.

* cited by examiner

CHROMATIC DISPERSION COMPENSATION

PRIORITY

This nonprovisional application is a U.S. National Stage Filing under 35 U.S.C. § 371 of international Patent Application Serial No. PCT/EP2017/050091 filed Jan. 3, 2017 and entitled "CHROMATIC DISPERSION COMPENSATION" which claims priority to U.S. Provisional Patent Application No. 62/300,359 filed Feb. 26, 2016 both of which are hereby incorporated by reference in their entirety.

TECHNICAL FIELD

The disclosure relates to a device, method and system for processing an optical signal. Examples relate to compensation of chromatic dispersion.

BACKGROUND

Integrated semiconductor photonic circuits are used as parallel optical transceivers for high speed optical interconnect, and there is now the possibility to scale the capacity of the optical interconnect to 100 Gbps and beyond. The reach of such an interconnect may be up to a few tens of kilometres. The integration level of photonic circuits may be scaled by introducing many optical processing circuits onto a small chip of a few square millimetres in size, for example for use in emerging optical transport applications for mobile fronthaul and back-haul networks and for use in optical circuit switching for data centres. These circuits may use complementary metal-oxide-semiconductor (CMOS) technology photonics.

These applications may utilise multi-wavelength technology, and wavelength division multiplexing (WDM) is often exploited to reduce the number of input/output ports required on these chips.

The transmission of high speed WDM signals among semiconductor photonic chips interconnected in an optical network may require the semiconductor photonic circuits to be interfaced with standard single mode fibers (SMFs). The length of a section of SMF could be between, for example, 100 m to 30 km.

Transmission of optical signals through an SMF generally changes the input signal polarization state into a random polarization state at the fibre output, due to fibre imperfections, twisting or other stress causes. This can cause interfacing issues at the semiconductor photonic circuits. For example silicon photonics circuits can only accept one linear input polarization state (TE mode).

Existing solutions may utilise polarization diversity structures placed at the input of the semiconductor photonic chips, for example as described by Chao Li, Jing Zhang, Jeong Hwan Song, Huijuan Zhang, Shiyi Chen, Mingbin Yu and G. Q Lo "Semiconductor Polarization Diversity Optical Tunable Filter Circuits with Fiber Assembly" Proceedings of 2011 IEEE Micro-Wave Photonics. This solution results in increased chip area, increased complexity, higher losses and/or higher manufacturing and implementation cost.

The advent of 5G mobile networks will lead to the introduction of high user capacities, and may significantly increase the geographical density of mobile users. Together with the introduction of beamforming and MIMO techniques, this may require the introduction of 100 Gbit/s optical transmission starting from the access segment. Coherent Dual polarization-quadrature phase shift keying (DP-QPSK) optical interfaces, widespread in 100 Gbit/s Dense Wavelength-Division Multiplexing (DWDM) regional and core networks, are not suitable, due to their high cost.

On the other hand, more cost effective direct detection options, like Pulse Amplitude Modulation-4 (PAM4) or Discrete multitone (DMT), require external devices for the compensation of the fiber chromatic dispersion. These external devices for the compensation of the fiber chromatic dispersion are a cost source as well.

Devices for the compensation of chromatic dispersion due to fiber optic transmission are based on a dispersion compensating fiber (DCF). Such devices are passive and reliable but, due to cost and large size, are not ideal for fronthaul applications (i.e. between a remote radio unit and a baseband processing unit in a radio access network).

Alternative devices may be based on Fiber Bragg Gratings (FBG), which present a smaller footprint, but their periodic frequency response (having free spectral range equal to the DWDM frequency grid) may lead to filtering distortions, depending on the signal modulation formats. Moreover, their cost is similar to DCF based devices for short compensation distances, as in fronthaul.

Moreover, both DCF and FBG are not tunable and require different devices for different compensation lengths. Liquid crystal devices may provide for tunability and filtering issues, but may still be a significant cost.

SUMMARY

A first aspect provides a device configured to receive an optical signal. The device comprises a dispersion compensator comprising a plurality of optical dispersion compensator units. Each optical dispersion compensator unit comprises a plurality of delay elements. The dispersion compensator is configured to selectively activate one or more of the optical dispersion compensator units. The dispersion compensator is configured to compensate for dispersion of the optical signal with the activated one or more optical dispersion compensator unit.

Thus, an amount of compensation dispersion may be controllably varied.

A second aspect provides a method of dispersion compensation of a received optical signal, comprising configuring a dispersion compensator comprising a plurality of optical dispersion compensator units. Each optical dispersion compensator unit comprises a plurality of delay elements. The method comprises configuring the dispersion compensator comprises selectively activating one or more of the optical dispersion compensator units, such that the dispersion compensator compensates for dispersion of the optical signal with the activated one or more optical dispersion compensator unit.

A third aspect provides a computer program product, comprising instructions which, when executed on at least one processing circuit, cause the at least one processing circuit to carry out the method according to any example.

A fourth aspect provides a controller configured to control a device arranged to receive an optical signal, wherein the device comprises a dispersion compensator comprising a plurality of optical dispersion compensator units. The controller is configured to control a selective activation of one or more of the optical dispersion compensator units, such that the activated one or more optical dispersion compensator unit compensates for dispersion of the optical signal.

BRIEF DESCRIPTION OF THE DRAWINGS

Embodiments of the disclosure will now be described, by way of example only, with reference to the figures, in which.

DETAILED DESCRIPTION

Figure 1:
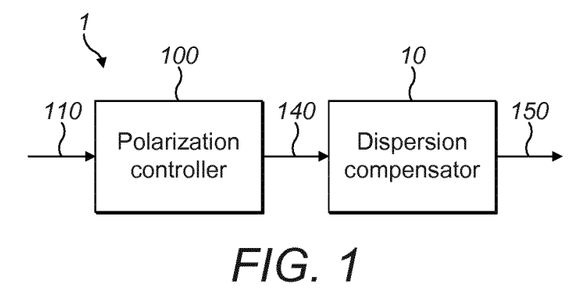
FIG. 1 schematically illustrates a device in accordance with an embodiment.

A device 1 is now described in accordance with an example of the disclosure. The device 1 comprises a polarization controller 100 and a dispersion compensator 10. The device 1 is configured to receive an optical signal at an input 110. The optical signal has been carried over an optical fiber. In some examples, the device 1 may be considered as a part of a receiver.

The polarization controller 100 is configured to receive the optical signal which comprises one or more wavelength having a combination of a first polarization mode (TM) and a different, second, polarization mode (TE). The polarization controller 100 is configured to convert the received combination of polarizations into one or more optical signals, each having only one polarization. The one or more single polarization optical signal(s) are transmitted from an output 140 to the dispersion compensator 10. The dispersion compensator 10 is configured to compensate for dispersion introduced into the optical signal(s) during transmission to the receiver.

For example, the dispersion compensator 10 is configured to compensate for dispersion introduced into the optical signal(s) by an optical fiber or other transmission medium along which the optical signal(s) are transmitted. The dispersion may be considered as an introduction of a time delay to the optical signal which is dependent on frequency. The time delay is a result of the velocity of the optical signal being dependent on the frequency in the dispersive transmission medium. The dispersion compensator 10 is configured to compensate for the introduced time delay. For example, the dispersion compensator 10 is configured to add a further time delay, so that the total time delay from both the transmission medium and the dispersion compensator 10 is substantially independent of frequency.

The device 1 may be considered as having a first stage of a polarization compensation stage, which aligns a random input polarization stage to a linear polarization direction, as implemented by the polarization controller 100. The linear polarization direction is required by the subsequent stage, used for dispersion compensation, and implemented by the dispersion compensator 10. The second stage compensates for the fiber chromatic dispersion.

The device 1 may be, or form part of, a semiconductor photonics circuit. The polarization control 100 and/or dispersion compensator 10 may be implemented as a semiconductor photonics circuit, e.g. in silicon photonics. The device 100 may be implemented as a single integrated photonics device or circuit, so as to avoid the risk of polarization changes by optical fiber interconnects.

In some examples, the device 1 comprises an optical-electrical transducer or photodetector, e.g. a photodiode, to provide for direct detection. Alternatively, the device 1 may be configured to be connected to one or more optical-electrical transducer, or a receiver (not shown) may comprise the device 1 and one or more optical-electrical transducer. For example, the device 1 may be a part of a receiver of a 100 Gbit/s optical transmission system. The invention enables the cost effective implementation of direct detection high speed interfaces. In some examples, the device 1 is used in a fronthaul network. For example, the device 1 is in a receiver of a remote radio unit and/or a baseband processing unit.

In some examples, the device 1 comprises a circuit which is monolithic (i.e. just one material), e.g. Silicon or Silicon Nitride. This allows for the integration of photodetectors, which in some examples are built in Germanium. The polarization recovery or polarization compensators, and monitoring and receiver photodetectors may be built in the same monolithic device.

Figure 2:
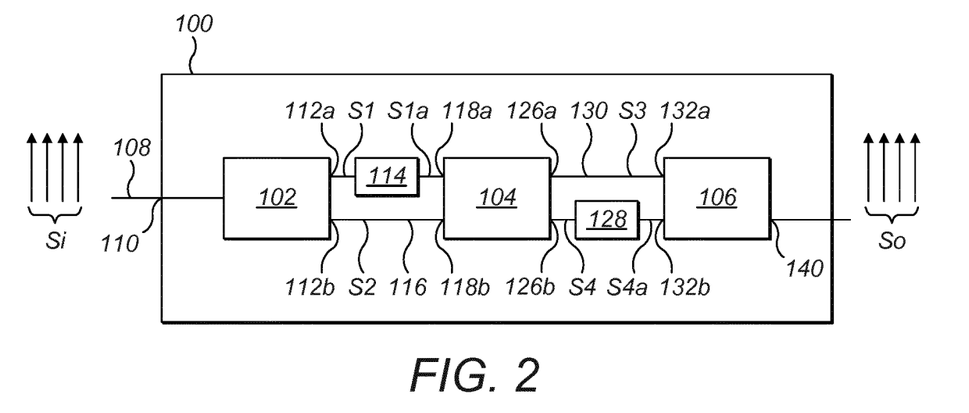
FIG. 2 schematically illustrates a polarization controller in accordance with the embodiment.

FIG. 2 describes an example implementation of the polarization controller 100. The polarization controller 100 comprises a polarization handling block 102, a first optical coupler 104 and a second optical coupler 106. Polarization handling block 102 is arranged to be coupled to a section of single mode optical fiber 108 through the input port 110, termed the first input port 110. In some examples, the polarization handling block 102 is a polarization splitter-rotator (PSR). Optionally, additionally or alternatively polarization handling block 102 may comprise a grating coupler.

The polarization handling block 102 comprises a first output port 112a and a second 112b output port. The first output port 112a is coupled to a first optical phase shifter 114. The first optical phase shifter 114 is coupled to a first input port 118a of the first optical coupler 104. The second output port 112b is coupled to a first inner section of optical waveguide 116. Thus, the second output port 112b is directly coupled to a second input port 118b of the first optical coupler 104.

The first optical coupler 104 has a first output port 126a and a second output port 126b. The first output port 126a is coupled to a second inner section of optical waveguide 130. Thus, the first output port 126a is directly coupled to a first input port 132a of the second optical coupler 106. The second output port 126b is coupled to a second optical phase shifter 128. The second optical phase shifter 128 provides a signal S4a which is coupled to a second input port 132b of the second optical coupler 106.

The polarization handling block 102, alternatively termed a polarization module, may be considered as generally receiving one or more wavelength (i.e. optical channel) having a first polarization mode (e.g. Transverse Magnetic, TM) and a different, second, polarization mode (Transverse Electric, TE). The polarization handling block 102 is configured to convert a component of the first polarization mode (TM) into a component of the different, second, polarization mode (TE). This changed signal for each wavelength may be referred to as a converted signal. The polarization handling block is further configured to output the received component of the second polarization mode without polarization mode conversion, i.e. as a direct signal. The converted signal and direct signal are output from separate outputs of the polarization handling block 102.

The first and second optical phase shifters 114,128 and first and second optical couplers 104,106 may be considered as a processing module. As described below, the processing module is configured to receive a first and second input for each wavelength. One of the first and second inputs receives the converted signal, i.e. has a particular polarization mode (e.g. TE) which has been converted from a different polarization mode (e.g. TM). The other of the first and second inputs receives the direct signal, i.e. has the same polarization mode directly from the received WDM signal, i.e. without conversion. Thus, the received two inputs at the processing module have the same polarization (TE).

The polarization controller 100 is configured to output a single output having the same polarization mode, i.e. a single mode, e.g. the second polarization mode (TE). Alternatively, the polarization controller 100 is configured to output a first and second output. The first output has only one polarization mode. The second output has only one polarization mode, being the other polarization mode to the first output.

As described below, the processing module is configured to control the phase difference (to be in phase) between the direct and converted signals (e.g. with the first optical phase shifter 114), such that the received direct and converted signals are converted into two optical signals of equal power (e.g. by the first optical coupler 104). The processing module is further configured to combine the two equal power optical signals of each wavelength. The combining is carried out by controlling the phase of the two equal power signals (e.g. to be $\pi/2$ out of phase, using the second optical phase shifter) such that an element of the processing module (e.g. second optical coupler 106) outputs all received power from its two inputs into a single or two optical output(s) each having only one polarization mode.

The first and/or second optical coupler 104,106 is a conventional 3 dB coupler, and it will be appreciated that other constructions of couplers may be used.

The first and/or second optical phase shift modules 114 and 128 may be controlled to vary the applied phase shift. For example, the applied phased shift is controlled electronically. In some examples, the phase shift is controlled by a metal heater which is driven by a variable electrical power source. When current is passed through the heater a phase shift is applied to the wavelength components of the multi-wavelength components propagating through the respective first and second optical phase shift modules 114 and 128. It will be understood that other power sources may be used to drive the first and second optical phase shift modules 114 and 128. The phase shift is controlled, e.g. using a processor, in order to ensure that the correct phase is output to the following optical coupler, as described below. The first and second phase shifters may be controlled to vary in response to, and compensate for, changing input phases, e.g. due to thermal or mechanical stresses on the fiber result in varying phase modulation dispersion.

In one embodiment, the phase change of the first and/or second optical phase shift modules 114 and/or 128 is controlled by performing light detection at an output of the of the second 3 dB coupler 106 not used to output an optical signal So to the dispersion compensator 10. In some aspects, a measurement unit is configured to measure a parameter of the device, and provide feedback for control of the first and/or second optical phase shifters. For example, a photodiode is used to detect optical power. The phase shift applied by the first and/or second optical phase shift modules 114 and/or 128 is controlled to find the condition of a minimum light detection at the output of coupler 106 not used for an output signal, i.e. maximum dark. In another embodiment, the measurement unit measures an input signal by tapping a small portion of light output of the second 3 dB coupler 106 used for output. The device 100 is configured to find and maintain the condition of maximum light. The phase change of the first and/or second optical phase shift modules 114 and/or 128 is controlled in response to that measurement. In a further example, the measurement unit may detect the phases of the any of the optical signals in order to control the applied first and second phase shifts. Thus, the relative phases received at the first and second optical couplers are maintained, even if the relative phases received from the polarization handling block vary over time.

Figure 3:
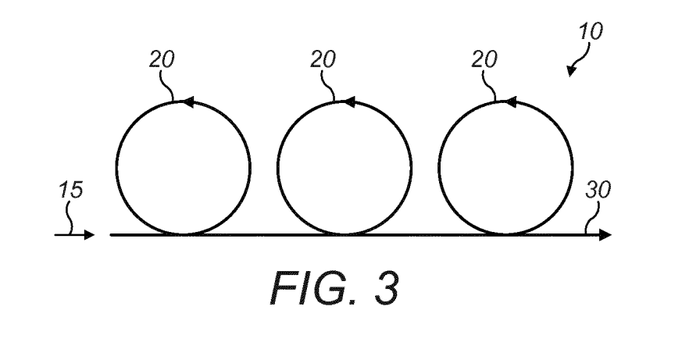
FIG. 3 schematically illustrates an example of a dispersion compensator in accordance with the embodiment.

FIG. 3 shows an example implementation of the dispersion compensator 10. The dispersion compensator 10 comprises an input 15 configured to receive an optical signal. For example, the input 15 is configured to receive a single polarization optical signal, e.g. from the polarization controller 100. The optical signal may comprise one or more wavelengths. The dispersion compensator 10 comprises a set of a plurality of delay elements 20. In this example, each delay element 20 is a micro-ring resonator. The delay elements 20 are each coupled to an optical bus 25. The input 15 provides the optical signal onto the optical bus 25, e.g. from the polarization controller 100. The optical bus 25 has an output 30, which in some examples is the output of the dispersion compensator 10. The output 30 is configured to output the optical signal on which dispersion compensation has been carried out.

The optical bus 25 is arranged such that an input signal is coupled to each of the plurality of delay elements 20. The plurality of delay elements 40 may be considered as connected in parallel to the optical bus 45. Thus, an input signal is delayed by all of the delay elements 20, i.e. micro-ring resonators.

The plurality of delay elements 20 are each configured to provide a time delay to a different frequency range of the optical signal. Each frequency range may be considered as a sub-band of optical signal. In some aspects, the frequency range response of each delay element may be considered as a sub-band of the whole target compensation bandwidth. The frequency ranges of two or more of the delay elements 20 may overlap. In some examples, a primary or main time delay introduced by each delay element 20 is different. Thus, the optical signal undergoes a time delay across a wide frequency range. The time delay provided by the set of delay elements 20 may be configured to be dependent on frequency, i.e. since different delay elements 20 provide the delay for different frequencies.

Figure 4:
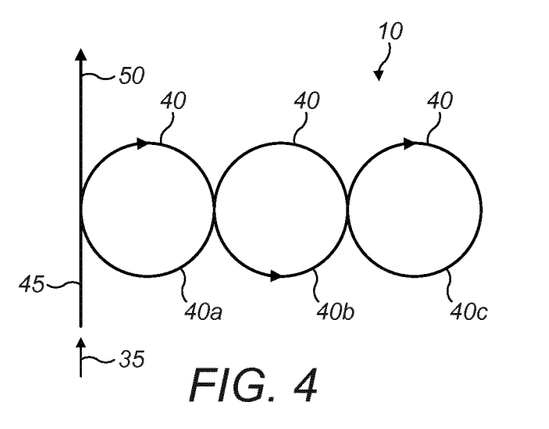
FIG. 4 schematically illustrates a further example of a dispersion compensator in accordance with the embodiment.

FIG. 4 shows a further example of dispersion compensator 10. In this example, the dispersion compensator 10 comprises a set of a plurality of delay elements 40. The delay elements 40 are in a different arrangement than the delay elements 20 described in FIG. 3.

As described above, each delay element 40 may be a micro-ring resonator. A first delay element 40a is coupled to an optical bus 45. The optical bus 45 has an input 35 configured to receive an optical signal, e.g. from the polarization controller 100. The optical bus 45 has an output 50, configured to output the optical signal on which dispersion compensation has been carried out.

The first delay element 40a is coupled to a second delay element 40b. As such, the second delay element 40b is not directly coupled to the optical bus 45. The second delay element 40b is only coupled via the first delay element 40a. In this example, a third delay element 40c is coupled to (and only to) the second delay element 40b. Thus, a plurality of delay elements 40a,40b,40c may be considered as connected in series to the optical bus 45. An optical signal travelling along the optical bus 45 from the input 35 is coupled to enter the first delay element 40a.

The first delay element 40a introduces a first time delay on a first frequency range (i.e. sub-band of the whole target compensation bandwidth). The optical signal is coupled into the second delay element 40b, in this case from the first delay element 40a, where a second time delay is introduced on a second frequency range, different from the first frequency range. The optical signal is coupled into the third delay element 40c, in this case from the second delay element 40c, where a third time delay is introduced on a third frequency range, different from the first or second frequency range. The optical signal is then coupled back via the second and first delay elements 40b,40a, to the optical bus 45 and transmitted from output 50.

FIGS. 3 and 4 have described examples of the optical dispersion compensator 10 using three delay elements, e.g. three micro-ring resonators. The optical dispersion compensation may be carried out using any number of delay elements, e.g. any number of micro-ring resonators. For example, the optical dispersion compensation may be carried out using a plurality of delay elements, e.g. 2, 3, 4, 5 or more delay elements. The set of delay elements may be coupled together in series or parallel. Each delay element may be considered as a compensator or an elementary compensator. An example implementation of the device is based on Silicon or Silicon Nitride micro-ring resonators, which are used as elementary compensating blocks.

Figure 5:
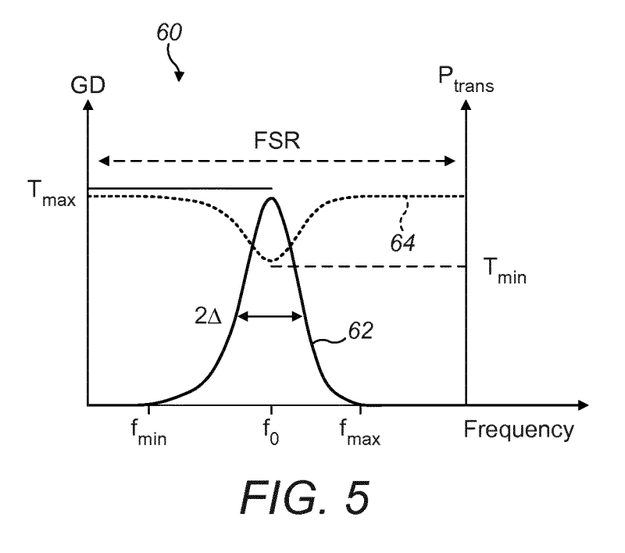
FIG. 5 shows a diagram of example optical characteristics of a part of the dispersion compensator.

FIG. 5 shows a diagram 60 indicating example optical properties of a micro-ring resonator for implementing a delay element 20,40. The diagram indicates that a delay 62 introduced by the micro-ring resonator is a function of frequency, and has a peak value of IMAX at a central frequency $f_0$. Each micro-ring resonator presents a periodic frequency response, which is bell-shaped within each period (the period is also known as free spectral range, FSR). In FIG. 5, $f_{MAX}$ and $f_{MIN}$ indicate, respectively, the upper and lower bounds of a frequency interval centered on $f_0$ and having width equal to the FSR; $2\Delta$ is the full wave half maximum (FWHM) width of the bell curve. Within each period, a transmission power 64 has a minimum value ($T_{min}$) at the peak frequency $f_0$ and achieves higher values for frequencies above and below the peak value, up to a maximum transmission power value at $f_{Max}$ and $f_{MIN}$.

Figure 6:
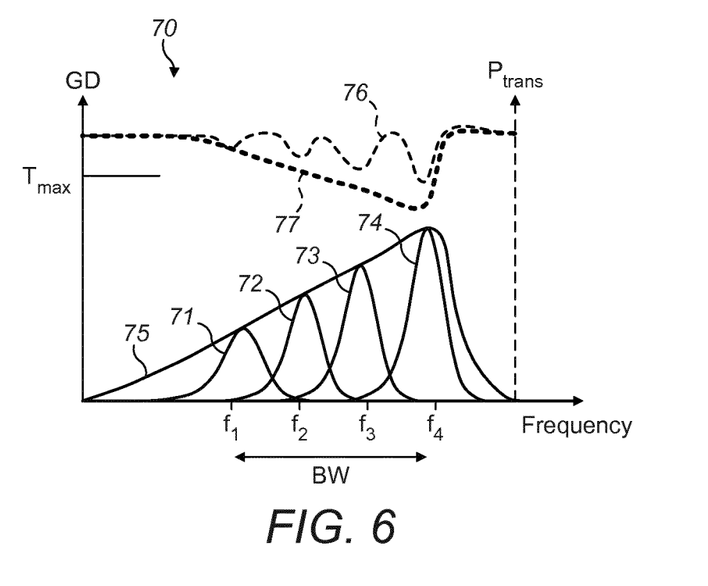
FIG. 6 shows a diagram of example optical characteristics of the dispersion compensator.

FIG. 6 shows a diagram 70 indicating example optical properties of a set of a plurality of delay elements 20;40, e.g. micro-ring resonators for implementing the dispersion compensator 10. In this example, there are four delay elements 20;40, for example arranged according to the example of FIG. 3 or 4.

The delay elements 20;40 are each configured to provide a group delay response, labelled as 71, 72, 73, 74. The delay elements 20;40 are configured to each have a different central frequency at which there is a peak value of group time delay $\tau_{MAX}$. The central frequencies of the delay elements 20,40 are labelled as $f_1$, $f_2$, $f_3$, $f_4$. The central frequencies may alternatively be considered as shifted or separated in frequency.

Thus, each delay element 20,40 has a central frequency in a different sub-band of the overall bandwidth BW for which dispersion compensation is provided.

As described above, the group delay response of each of the delay elements extends in frequency beyond the central frequency $f_1$, $f_2$, $f_3$, $f_4$. The separation of the central frequency $f_1$, $f_2$, $f_3$, $f_4$ is arranged such that the delay response of the delay elements is overlapping. For example, the sub-bands of the delay response of the delay elements partially overlap. As such, the time delay introduced is a combination of the delay response from a plurality (e.g. two) delay elements, for at least part of the bandwidth.

The group delay provided by the set of delay elements increases proportionally with frequency. In this example, the delay elements are arranged to introduce different amount of group delay (e.g. the maximum delays are different). For example, the delay elements are individually and differently attenuated. In particular, as the central frequency $f_1$, $f_2$, $f_3$, $f_4$ of a delay element increases, the maximum group delay provided by the delay element also increases.

The combined time delay from the set of the plurality of delay elements is arranged to be a predefined function 75, which compensates for the dispersion of the transmission medium. In this example, the set of delay elements provides a linear group delay response 75. The cascaded group delay response is approximately linear over the whole compensation bandwidth. The group delay response 75 from the set of the delay elements increases substantially proportionally with increasing frequency.

The delay elements may be tuned to control the delay characteristics. For example, the delay elements may be tuned by controlling two heaters, e.g. which vary a path length of the delay element (e.g. micro-ring resonator) and its power coupling coefficient to a waveguide (e.g. optical bus). The dispersion compensation, e.g. a delay amount and/or variation of delay with frequency (i.e. slope) may be controlled by controlling the delay elements. This control provides for compensating dispersion in a different length of optical fiber and/or compensating dispersion in an optical fiber having different dispersion characteristics. The required dispersion compensation may be measured or determined. The dispersion compensator is then configured by tuning of the set of delay elements.

A transmission power 76 is shown for the each of the set of the delay elements. An overall approximation of the transmission power 77 is also shown, having a linear response, in which the transmission power decreases as the frequency (and compensating delay) increases. In some examples, the set of delay elements may be adjusted or tuned to compensate for the particular transmission medium, for example, to compensate for a particular length of optical fiber. In some examples, the individual attenuation values of the delay elements are adjusted. The attenuation values are adjusted to fix the chromatic dispersion slope (i.e. the variation in compensation delay versus the wavelength). For example, a response of each delay element is adjusted by regulating a coupling coefficient K of the micro-ring resonator to the optical bus or another micro-ring resonator. This determines the maximum delay provided by each micro-ring resonator, i.e. the peak values of the bell-shaped curves.

Figure 7A:
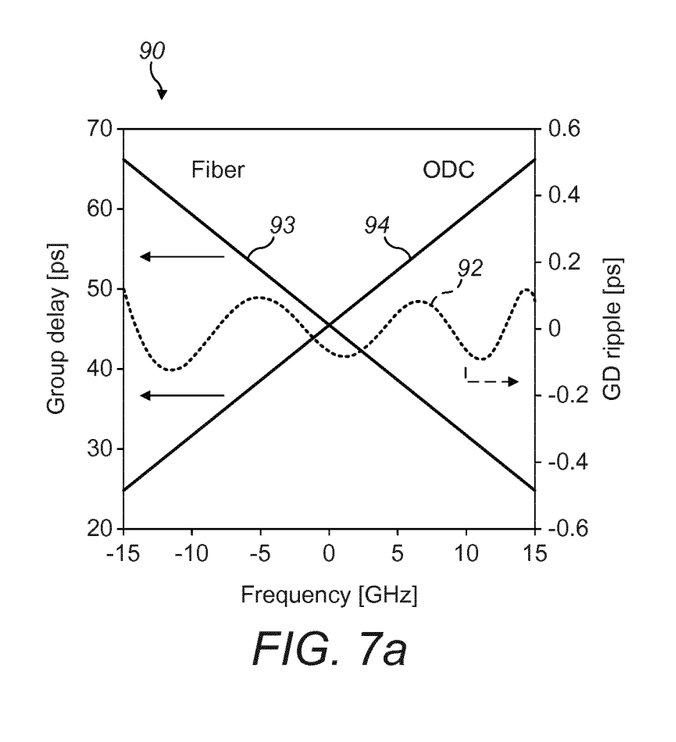
FIGS. 7a and 7b shows a diagram of example optical characteristics of the dispersion compensator.
Figure 7B:
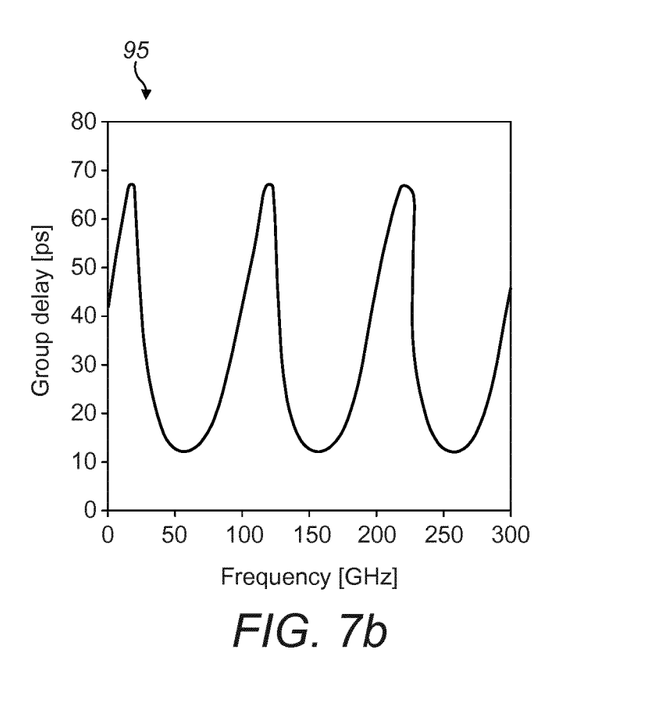
Figure 8:
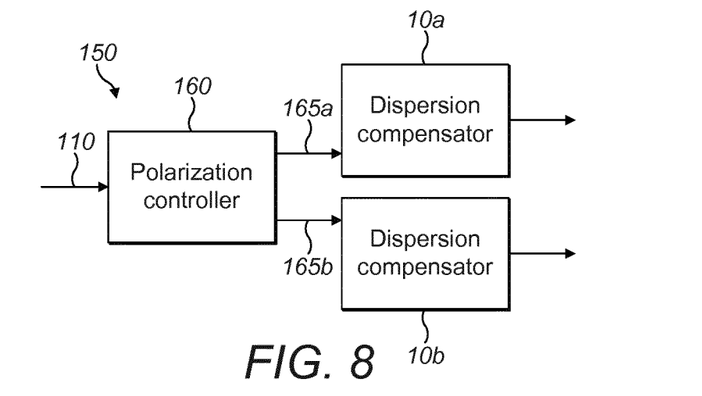
FIG. 8 schematically illustrates a device in accordance with a further embodiment.

FIGS. 7a and 7b show an example of simulation results for a dispersion compensator 10 comprising three micro-ring resonators.

FIG. 7a shows a diagram 90 including a group delay response of micro-ring resonators over a 30 GHz bandwidth. The three micro-ring resonators provide for compensation for multi-level modulation formats for a 50 Gbit/s transmission. In some examples, 100 Gbit/s is achieved by transmission using two orthogonal polarization states.

A total time delay is shown by line 92, i.e. including both transmission medium dispersion and compensating delay. This shows that the group delay is substantially independent of frequency, i.e. the dispersion has been compensated. The group delay is not perfectly constant; there is a ripple in the group delay, between approximately 0.1 ps and −0.1 ps. The diagram 90 further shows an example group delay 93 due to the transmission medium (fiber), and an example compensating group delay 94 due to the dispersion compensator. These delays are approximately between 25 ps and 65 ps. Thus, the dispersion may be considered as substantially compensated. The arrows in the diagram 90 merely indicate which axis is applicable to the lines 92,93,94.

FIG. 7b shows a diagram 95 of a group delay 96. The group delay 96 shows the delay 94 (shown in FIG. 7a) over a wider frequency range.

The free spectral range of the group delay 96 (i.e. the frequency spacing around the peaks) may be adjusted. The FSR may be adjusted to be equal to a channel frequency spacing for transmission using a plurality of channels, e.g. a WDM or DWDM system. For example, the FSR is adjusted by thermally controlling a radius of the micro-ring resonator, in order to obtain a desired periodic frequency response. This allows the same dispersion compensator device to operate for all the channels in a DWDM system (i.e. DWDM comb). Thus, different variants of the device are not required for different wavelengths. The device may be considered as colorless.

Figure 9:
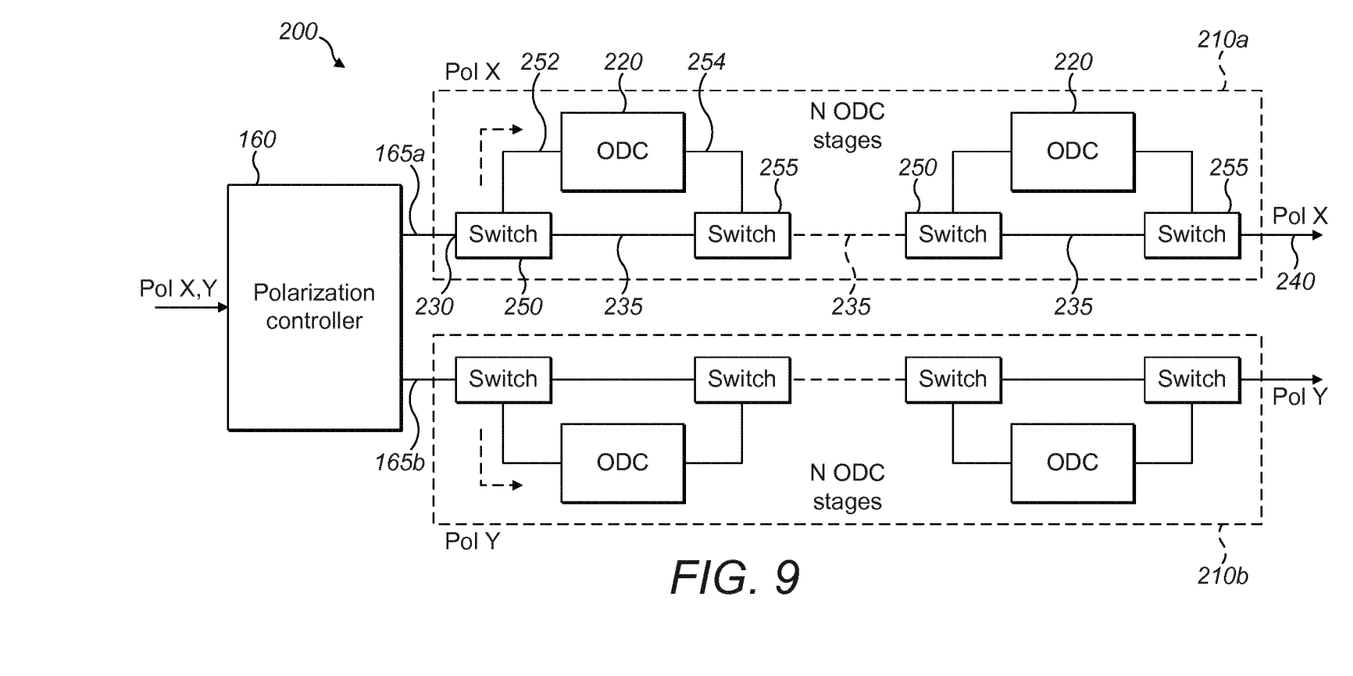
FIG. 9 schematically illustrates a device in accordance with the further embodiment.

FIG. 9 shows a further example of the device 1, labelled as device 150. The device 150 comprises a polarization controller 160 having an input 110 configured to receive an optical signal from a dispersive transmission medium, as described above. In this example, the optical signal comprises two polarizations for carrying data. For example, the modulation format is DP-QPSK. The polarization controller 160 is configured and operates substantially according to the polarization controller 100 described above, except that the polarization controller 160 has a first output 165a and a second output 165b. The first output 165a and second output 165b are each configured to output an optical signal having only one polarization. The single polarizations output from the first output 165a and second output 165b are different. For example, the second optical coupler 106 described above is configured such that both outputs are used, corresponding to the first output 165a and second output 165b.

The device 150 further comprises a first and second dispersion controller 10a, 10b. Each of the first and second dispersion controller 10a, 10b is configured to receive one polarization from the first output 165a or second output 165b. Each of the first and second dispersion controller 10a, 10b comprises one or more sets of a plurality of delay elements 20,40, as described above, e.g. using micro-ring resonators. The first and second dispersion controller 10a, 10b are each configured to compensate for dispersion in one polarization of the optical signal. The dispersion controllers 10a, 10b have any example structure, properties and operation as described for the dispersion controller 10.

Figure 10A:
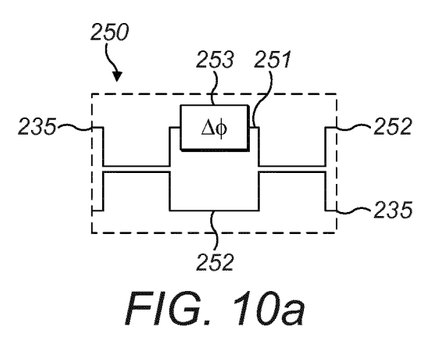
FIGS. 10a and 10b schematically illustrates a part of the device in accordance with the further embodiment.

FIG. 10 shows a further example of a device 200. The device 200 comprises a polarization controller 160. This is as described in the example of FIG. 9, and provides a first output 165a having a first polarization (e.g. Polarization X) and a second output having a second polarization (e.g. Polarization Y).

The device 200 further comprises an example of dispersion compensator. In this example, there are two dispersion compensators, namely a first dispersion compensator 210a arranged to receive the first output 165a and a second dispersion compensator 210b arranged to receive the second output 165b. The first and second dispersion compensators 210a,210b are substantially the same, and are each arranged to receive a controlled polarization from the polarization controller 160. Only the first dispersion compensator 210a is described, since the same elements and operation are applicable to the second dispersion compensator 210b.

The first dispersion compensator 210a comprises a plurality of optical dispersion compensator units 220. Each optical dispersion compensator unit 220 is a set of delay elements 20,40. An optical dispersion compensator unit 220 comprises a plurality of delay elements 20,40, e.g. micro-ring resonators, as described for example in the embodiments of FIG. 3 or 4, in any suitable arrangement. An optical dispersion compensator unit 220 is configured to provide for a dispersion compensation of dispersion introduced to an optical signal, as described in any example of a dispersion compensator. An optical dispersion compensator unit 220 may be considered as corresponding to the described dispersion compensator 10, and may be implemented according to any example, e.g. as described with respect to FIG. 3 or 4. The first dispersion compensator 210a may comprise any number N of optical dispersion compensator units 220, e.g. 2, 3, 4, 5 or more.

The first dispersion compensator 210a comprises an optical bus 235 configured to carry the optical signal from an input 230 to an output 240. The input 230 is connected to the output 165a of the polarization controller 160. The output 240 may be considered as an output of the first dispersion compensator 210a. The optical bus 235 is separate to the optical bus 25,45 within an optical dispersion compensator unit 220.

The optical bus 235 is connected to a plurality of first switches 250. A first switch 250 is configured to selectively couple or not couple the optical signal to an associated one of the optical dispersion compensator units 220. If the first switch 250 is controlled to couple the optical signal to the associated optical dispersion compensator unit 220, the optical signal is diverted from the optical bus 235 to the associated optical dispersion compensator unit 220 along a waveguide 252. The optical signal is diverted in its entirety, i.e. in this state there is no optical signal continuing along the optical bus 235 past the first switch 250. In a further state, the first switch 250 is controlled to not couple the optical signal to the associated optical dispersion compensator unit 220. In this case, the optical signal bypasses the associated optical dispersion compensator unit 220 and continues along the optical bus 235.

If the optical signal is transmitted through the optical dispersion compensator unit 220, a dispersion compensation delay is applied as described by the set of a plurality of delay elements. For example, the compensation delay shown in FIG. 6 is applied to the optical signal.

The first dispersion compensator 210a further comprises second switches 255. The second switches 255 are controlled to couple an optical signal output by the optical dispersion compensator unit 220 (i.e. from output 30;50) on a waveguide 254 to the optical bus 235, in the direction of the output 240. For an optical signal which bypassed the associated optical dispersion compensator unit 220, the second switch 255 is controlled to allow the optical signal to continue along the optical bus 235.

A first and second switch 250,255 is associated with a plurality of the optical dispersion compensator unit 220, e.g. each of the optical dispersion compensator units 220.

An optical dispersion compensator unit 220 which receives the optical signal and provides dispersion compensation may be considered as activated. An optical dispersion compensator unit 220 which is bypassed may be considered as inactivated or deactivated. In this example, the activation or deactivation of a particular optical dispersion compensator unit 220 is controlled by at least the associated first switch 250, and optionally implemented also using the associated second switch 255.

The first dispersion compensator 210*a* is configured to selectively apply dispersion compensation using one or more of the plurality of optical dispersion compensator unit 220, for example, by control of the first and second switches 250,255. The first dispersion compensator 210*a* may be controlled to route the optical signal into none, or one or more, optical dispersion compensator units 220. Each optical dispersion compensator unit 220 may be independently inactivated or deactivated. For example, each of the first switches 250 is independently controllable. In some examples, the second switch 255 operates in a state corresponding to the associated first switch 250. As such, the dispersion compensator is configured to selectively activate one or more of the optical dispersion compensator units 220.

The first dispersion compensator 210*a* is configured to provide a controllable dispersion compensation to a received optical signal. By selecting a number, or which, of the optical dispersion compensator unit 220 are activated, a controllable amount of dispersion compensation can be provided. The amount of dispersion compensation is a sum of the dispersion compensation from the activated optical dispersion compensator unit 220. For example, if the first dispersion compensator 210*a* comprises four optical dispersion compensator units 220, two optical dispersion compensator unit 220 may be activated to provide a required amount of optical dispersion compensation.

The required amount of dispersion compensation may depend on a length of transmission medium, e.g. optical fiber, and dispersion characteristics of the transmission medium, along which the optical signal has been transmitted. The fiber length and/or characteristics may be determined to have a value by measurement or configuration. For example, each optical dispersion compensator unit 220 is configured to compensate for 10 km of optical fiber. For a 20 km fiber length, the first dispersion compensator 210*a* is configured to activate two optical dispersion compensator units 220. Any further optical dispersion compensator units 220 are deactivated, i.e. bypassed, such that the deactivated optical dispersion compensator unit 220 do not contribute to the dispersion compensation.

In some examples, each of the optical dispersion compensator unit 220 provides a same dispersion compensation. For example, each optical dispersion compensator unit 220 compensates for 10 km of optical fiber. Alternatively, one or more of the optical dispersion compensator unit 220 provide a different amount of dispersion compensation to another dispersion compensator unit 220. Thus, the required amount of dispersion compensation may be achieved by selecting a required number of activated dispersion compensator unit 220 and/or selecting one or more particular ones of the dispersion compensator units 220 as activated.

Figure 10B:
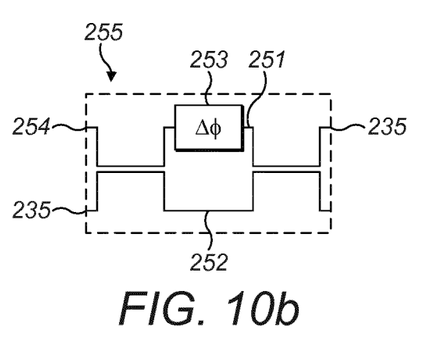

The dispersion controllers 210*a*, 210*b* have been described with respect to a device 200 in which two polarizations are separately compensated. The first dispersion controller 210*a* may alternatively be used as the only dispersion controller. For example, the arrangement and function of the first dispersion controller 210*a* is used as the dispersion controller 10 in the device 1. The dispersion controllers 210*a*, 210*b* operate independently and in the same way, and so no further modification is needed for the device to comprise only one of the dispersion controllers 210*a*, 210*b*. The activation/deactivation control of a plurality of optical dispersion compensator unit 220 is applicable to a single dispersion compensator in the device, handling only one polarization. In this case, the structure is for one of the optical bus, with connected switches and associated sets of delay element. The operation and structure is the same.

Figure 11:
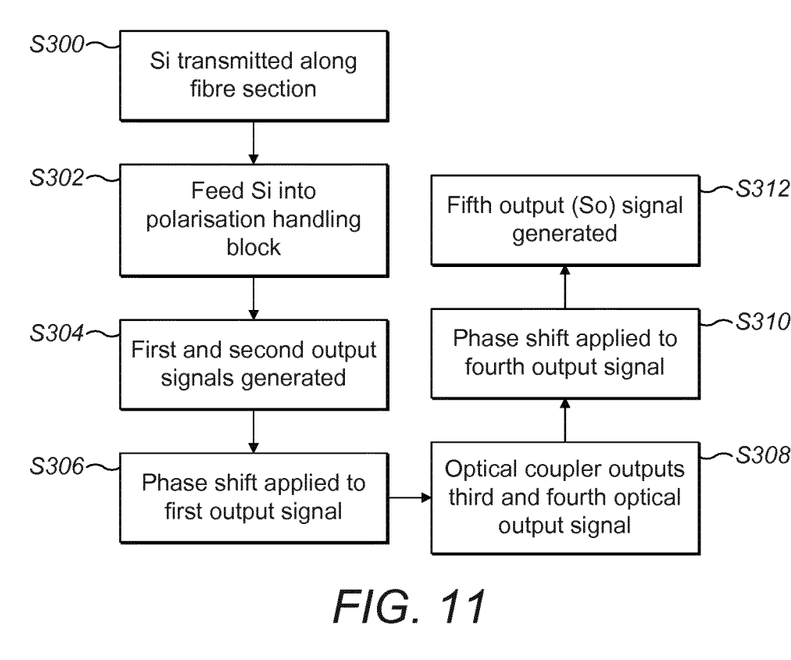
FIG. 11 illustrates an example method of the polarization controller.

FIG. 11*a* shows an example implementation of a first switch 250. The first switch 250 may be implemented using a Mach-Zender interferometer. The first switch 250 comprises a single input, from the optical bus 235. The switch 250 splits the received signal into a first arm 251 and a second arm 252. A phase difference unit 253 is configured to apply a phase delay between the optical signal in the first and second arms 251, 252. The phase difference unit 253 may be implemented on the first arm 251 as shown, or on the second arm (not shown) or both first and second arms (not shown). The phase difference unit 253 controls a relative phase between the first and second arms to introduce a constructive or destructive interference at a selected one of the outputs to the waveguide 252 or to the optical bus 235. Thus, the switch 250 outputs the optical signal to one of the waveguide 252 or the optical bus 235.

FIG. 11*b* shows an example implementation of a second switch 255. The second switch 255 may be implemented using a Mach-Zender interferometer. The second switch 255 has substantially the same construction as the first switch 250, but configured with two inputs and one output. The second switch 255 comprises a first input from waveguide 254 and a second input from the optical bus 235. The switch 255 couples and then splits the received signals into a first arm 251 and a second arm 252. A phase difference unit 253 is configured to apply a phase delay between the optical signal in the first and second arms 251, 252. The phase difference unit 253 may be implemented on the first arm 251 as shown, or on the second arm (not shown) or both first and second arms (not shown). The second switch 255 has a single output to the optical bus 235. The phase difference unit 253 controls a relative phase between the first and second arms to introduce a constructive or destructive interference, to select one of the inputs 254,235 to output to the optical bus 235. Thus, the switch 250 outputs the optical signal from one of the waveguide 254 or the optical bus 235. Alternatively, the second switch 255 may be replaced by a coupler which couples any optical signal from either the optical bus 235 or the waveguide 253 onto the optical bus 235 in the direction of the output 240.

Figure 12:
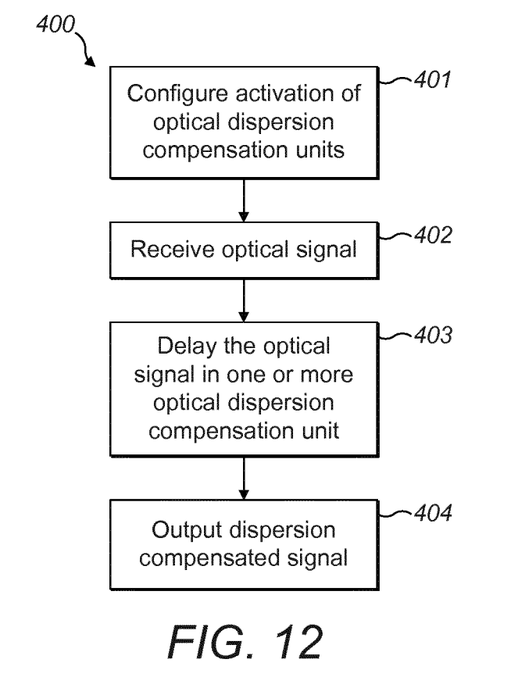
FIG. 12 illustrates an example method of the dispersion compensator.

Referring to FIG. 12, a multi-wavelength optical signal Si is transmitted along fiber section 108 in a step S300. In general, the optical signal Si may be a single optical channel or may be a WDM signal. In some examples, the device of any example may integrated into each individual receiver. In some examples, the transmitter is configured for point to point applications, e.g. a Digital Unit (DU) or Remote Radio Unit (RRU) interconnected in a radio access network. If Si is a WDM signal, the WDM wavelengths are generated in the same place and the transmission of the wavelengths has all of the wavelengths aligned in polarization. Any reference to a WDM signal may alternatively refer to a single channel example. In a further example, pluralities of devices are connected by fibres in an optical network. For example, the optical network may comprise one or more reconfigurable optical add-drop multiplexer (ROADM). Some of the transmitted wavelengths may be in by-pass, and some may be added.

For any example, the transmitter may be implemented as a silicon photonics device. As such, all of the wavelengths are polarization aligned, since the silicon photonic device generates a single polarization, and all the wavelengths will be TE-aligned.

During transmission of the WDM signal along the fiber 108, the polarization of each of the wavelengths of respective signals varies in a generally unpredictable way, for example, depending on temperature and other environmental factors.

The optical signal (Si) that is received from the optical fiber 108 is generally elliptically polarized. That is to say, each of the wavelength components comprises a transverse electrical polarization (TE) mode and a transverse magnetic polarization (TM) mode. In the elliptic polarization, the transverse electric polarization mode and the transverse magnetic polarization mode have arbitrary amplitudes and phases. Thus, at the device input 110, all of the wavelengths of the optical signal Si generally have the same elliptical polarization, with a component in TE and a component in TM, with any amplitudes and relative phase.

However, the polarization of the wavelengths will each change uniformly due to the randomly varying birefringence of the fiber 108, which causes changes in the polarization modes of the optical signal being transmitted.

In some examples, wavelengths transmitted are selected to be within a predetermined bandwidth. The bandwidth is determined such that the wavelengths within the bandwidth have polarization modes have a variation which is substantially uniform among the wavelengths. Thus, if the wavelengths are inside the defined bandwidth, also termed the principal states of polarization bandwidth AA, of the fiber 108, the polarization of each wavelength will change consistently with each other wavelength. Thus, all of the transmitted wavelengths may be considered as polarization aligned at the output of the fiber 108, and input of the device 100. A transmitter is therefore configured to transmit only wavelengths for which the polarization mode dispersion is substantially the same, and hence for which the receiving device 100 can handle as an input WDM signal.

The propagation of the multi-wavelength optical signal along fiber section 108 results in the multi-wavelength optical signal being fed into the polarization handling block 102 due to the coupling at input 110 between the fiber section 108 and the polarization handling block 102 in a step S302.

The polarization handling block 102 is configured to receive WDM signals, wherein each wavelength comprises components of a transverse electric polarization TE mode and a transverse magnetic polarization TM mode. The polarization handling block 102 is configured to convert the transverse magnetic polarization mode component of the elliptically polarized signal Si to a transverse electric polarization mode. The polarization handling block 102 is configured to output only wavelengths having one or more transverse electric polarization mode. The polarization handling block 102 has two outputs: one for outputting the received transverse electric polarization mode and one for outputting the transverse electric polarization mode converted from the transverse magnetic polarization mode.

Generally, the received multi-wavelength optical input signal Si will comprise elliptically polarized carrier signals due to the differential group delay of the fiber 108. The wavelengths may be considered as optical carrier signals. The wavelengths or carrier signals may be modulated (e.g. by the transmitter) to carry information. Since, the transmitted wavelengths are all within the principal states of polarizations bandwidth of the optical fiber, each carrier signal (wavelength) will have substantially the same arbitrary state of polarization. The polarization module 102, also termed the polarization handling block 102, resolves the elliptically polarized carrier signals into their transverse electric TE and transverse magnetic TM mode component signals and then converts the transverse magnetic TM mode signals into transverse electric TE mode signals. The converted and directly derived signals are then output as respective signals of the same mode having arbitrary amplitudes and phases according to the state of the elliptically polarized signal Si.

The polarization handling block 102 therefore provides the effect that the transverse magnetic polarization mode of the optical input signal Si, for all wavelengths, is converted into a transverse electric polarization TE mode and/or a transverse magnetic TM mode. This means that the elements that follow the polarization handling block 102 need only process a single polarization mode.

Although the polarization handling block 102 is described above in relation to FIG. 2, it will be understood that a polarization splitter and rotator may also be used to split the transverse electric polarization mode and the transverse magnetic polarization mode and rotate the transverse magnetic polarization mode to form a transverse electric polarization mode before outputting two signals which both comprise a transverse electric polarization mode.

The first phase shifter 114 applies a phase shift to each wavelength component of one or the outputs from the polarization handling block 102, e.g. the first output optical signal S1 in a step S306. The phase shift applied by the first phase shifter 114 is continuously controlled to be equal and opposite to the phase difference between the two output signals S1, S2 of the polarization handling block 102, so as to bring the first and second signals S1, S2 into phase at the respective inputs of the first optical coupler 104. The phase of the second output optical signal S2 is substantially unchanged by the first inner waveguide 116. Each wavelength component of the first optical output signal S1 is therefore phase shifted and, following the phase shift, the wavelength components of the phase shifted first output optical signal S1a are in phase with each wavelength component of the second output optical signal S2.

The phase shifted first output optical signal S1a continues to propagate to the first input port 118a of the first optical coupler 104. The second output signal S2 continues to propagate to the second input port 118b of the first optical coupler.

As the wavelength components of the first and second output optical signals S1a, S2 (i.e. the optical signals into the first optical coupler 104) are propagating in phase, the first optical coupler 104 outputs two output signals of equal optical power, e.g. an exchange of energy occurs which distributes the power equally between the wavelength components of the first and second output optical signals to form third and fourth optical output signals S3, S4, which are of equal optical power.

The effect of the first optical phase shifter 114 is to bring the first and second signals S1, S2 into phase at the input of first optical coupler 104, which enables the first optical coupler 104 to generate third and fourth output signals S3, S4 of equal power and with a phase difference according to the power distribution of the first and second signals S1, S2. Each of the third and fourth optical output signals S3, S4 comprises only a transverse electrical polarization mode for each wavelength component.

The second optical phase shifter 128 applies a continuously variable second phase change to the wavelength components of the fourth optical output signal S4 in a step S310 such that the phase difference between the phase shifted fourth optical output signal and the third optical output signal is $\pi/2$ at the respective inputs of the second optical coupler 106. The variable phase shift applied by the second phase shifter 128 is such that the all the light at the second optical coupler 106 is output from only one particular output, as will be described hereinafter. Thus, the second phase shifter provides for the phase difference ($\pi/2$) between the two optical inputs, of equal power, into the second optical coupler 106 that provides for all, or a maximum, of power to a defined one of two outputs of the second optical coupler 106.

The second inner waveguide section 130 is coupled to the first input port 132a of the second optical coupler 106 and the second optical phase shifter 128 is coupled to the second input port 132b of the second optical coupler 106. Therefore, the wavelength components of the third optical output signal propagate to the second optical coupler 106 and the phase shifted fourth optical output signal propagate to the second optical coupler 106.

The second optical coupler 106 is a 3-dB optical coupler. The second optical coupler 106 has a single output port 140, to which all of the one or more optical channels are directed in some examples. All the light is coupled into the single output port due to the appropriate selection of the phase shift and amplitudes of the signals applied to its respective inputs i.e. if the signals are of the same amplitude and $\pi/2$ out of phase. All of the optical power is transferred to a single output port 140 which enables an optical output signal (So) to be formed at the output of the device 100 which comprises one or more wavelength components each comprising a transverse electric polarization mode in a step S312.

The effect of the second optical phase shifter 128 is to bring the third and fourth signals S3, S4 into the correct phase difference of $\pi/2$ at the input of second optical coupler 106, which enables the second optical coupler 106 to generate a single output signal (So) comprising multi-wavelength optical signals of the same polarization mode. Optionally, a second output signal of the other polarization mode may also be output.

Figure 13:
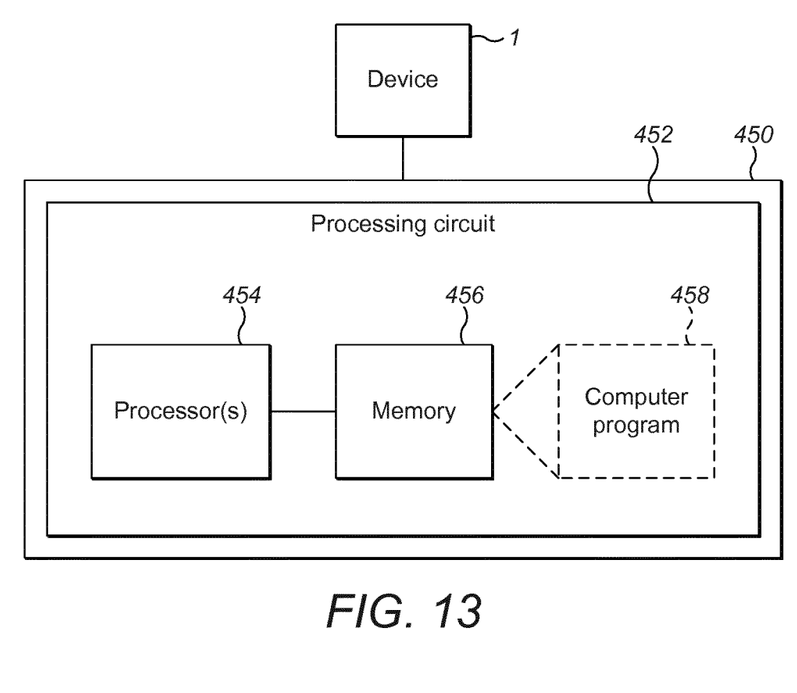
FIG. 13 illustrates a controller configured to control the device.

FIG. 13 shows an example method 400 of dispersion compensation. This method 400 may be used alone, or following the described polarization control or compensation.

The method 400 comprises in 401 configuring activation of optical dispersion compensation units 220. The activated optical dispersion compensation units 220 will provide for a cumulative dispersion compensation. The optical dispersion compensation units 220 which are not activated are controlled to be deactivated or bypassed. Optionally, the configuring activation (or deactivation) comprises controlling a first switch and optionally a second switch associated with each optical dispersion compensation units 220.

In 402, an optical signal is received. Optionally, the optical signal is received from a polarization controller 100,160. The received optical signal may have a single polarization and be compensated by one dispersion compensator, or the optical signal may comprise two polarizations which are received at separate inputs and handled by separate dispersion compensators.

In 403, the optical signal is delayed in one or more of the activated optical dispersion compensation units 220. The delaying may be carried out by a plurality of delay elements, e.g. micro-ring resonator, in each optical dispersion compensation unit 220. The delay elements are configured to provide a delay which varies with frequency, e.g. linearly varies with frequency, to compensate for the chromatic dispersion of the transmission medium over which the optical signal is received.

In 404, the dispersion compensated signal is output. The output may be a single output, or may be a separate output for each polarization.

The polarization controller 100 and associated method has been described as having first and second optical phase shifters connected to particular optical paths. The device and method may use any arrangement of phase shifters or phase controllers, on different or both paths, in order to implement the described phase differences.

Aspects of the disclosure provide for any combination of a transmitter, receiver or system comprising a transmitter, receiver and/or optical transmission medium (optical fiber). Any aspect may be applicable to any example, in any combination.

An aspect of the disclosure further comprises a controller configured to control the selective activation of one or more of the optical dispersion compensation units. The controller 450 is configured to control an amount of dispersion compensation. For example, the controller is configured to transmit control signals to the device. In some examples, the controller 450 may control a tuning of the delay elements, in order to control the amount of dispersion compensation and/or the polarization controller, and/or control polarization controller configuration. An aspect of the disclosure also relates to a method of operating the controller to control an amount of dispersion compensation, and a system of the device and controller.

In some examples, the device 1;150;200 (polarization controller and/or dispersion compensator) of any example comprises, or is controlled by, the controller 450 comprising one or more processing circuits 452. The processing circuit 452 comprises one or more digital processors 454, e.g., one or more microprocessors, microcontrollers, Digital Signal Processors (DSPs), Field Programmable Gate Arrays (FPGAs), Complex Programmable Logic Devices (CPLDs), Application Specific Integrated Circuits (ASICs), or any mix thereof. The processor(s) 454 of the processing circuit 452 may execute a computer program 458 stored in a memory 456 that configures the processor(s) 454. More generally, the processing circuit 452 may comprise fixed circuitry, or programmable circuitry that is specially configured via the execution of program instructions implementing the functionality taught herein, or may comprise some mix of fixed and programmed circuitry. The processor 454 may be multicore. The controller 450 may be integrated or connected with any example of the device 1;150;200.

A further aspect of the disclosure is a computer program, or a computer program product or carrier comprising the computer program, operable to provide for the control of the device 1.

Examples of the disclosure may relate to any combination of described examples. For example, a dispersion compensator comprising a plurality of optical dispersion compensator units which may be selectively activated or deactivated to control the compensation dispersion is applicable to a device having a single dispersion compensator (as shown in FIG. 1) or a device comprising a plurality of such dispersion compensators. For example, the first dispersion compensator 210a having a plurality of optical dispersion compensator units may be the only dispersion compensator in the device. The optical dispersion compensation may be carried out using a controllable number of one or more of a plurality of optical dispersion compensation units, e.g. 2, 3, 4, 5 or more optical dispersion compensation units.

Although the aspects have been described with reference to a signal comprising both transverse magnetic polarization modes and transverse electric polarization modes, i.e. elliptically polarized signals, the polarization insensitivity of the device means that only one polarization mode will be output by the device regardless of whether the signals received from the fiber are all transversely electrically, transversely magnetically or elliptically polarized. A further example of the device comprises the dispersion compensator of any example, without the polarization controller.

The invention claimed is:

1. A device configured to receive an optical signal, the device comprising:
    a dispersion compensator comprising a plurality of optical dispersion compensator units,
        wherein each optical dispersion compensator unit comprises a plurality of delay elements, and
        the dispersion compensator is configured to selectively activate one or more of the optical dispersion compensator units,
        wherein the dispersion compensator is configured to compensate for dispersion of the optical signal with the activated one or more optical dispersion compensator units;
    a polarization controller configured to output one or more optical signals to the dispersion compensator, wherein the or each optical signal has a single polarization;
    wherein the polarization controller comprises a polarization module configured to receive an optical input signal and configured to convert a component having a first polarization mode into a converted component having a second, different, polarization mode; and
    wherein the device further comprises a processing module configured to combine the converted component with a direct component received with said second polarization mode, wherein the processing module is configured to generate an optical output signal solely having said second polarization mode.

2. The device as claimed in claim 1 wherein each of the plurality of delay elements is configured to apply a delay to a sub-band of the optical signal.

3. The device as claimed in claim 2 wherein the sub-bands of the plurality of delay elements overlap in frequency.

4. The device as claimed in claim 1 wherein the optical dispersion compensator unit is configured to apply a delay to the optical signal which varies linearly with frequency.

5. The device as claimed in claim 1 wherein a said delay element is a micro-ring resonator.

6. The device as claimed in claim 1 wherein the optical dispersion compensator unit comprises an optical bus to which one or more of the delay elements is coupled, wherein the optical signal is delayed by each of the plurality of delay elements.

7. The device as claimed in claim 1 wherein the dispersion compensator comprises a first switch associated with each optical dispersion compensator unit, wherein the first switch is configured to be controllable to couple the optical signal with the associated optical dispersion compensator unit to activate the optical dispersion compensator unit.

8. The device as claimed in claim 7 wherein the first switch is configured to selectively couple the optical signal with the associated optical dispersion compensator unit to activate the optical dispersion compensator unit or to couple the optical signal to an optical bus to bypass the optical dispersion compensator unit.

9. The device as claimed in claim 7 wherein the first switch comprises a Mach-Zender interferometer.

10. The device as claimed in claim 1 wherein the device comprises a first dispersion compensator and a second dispersion compensator, wherein the first dispersion compensator is configured to receive a first optical signal having a first polarization and the second dispersion compensator is configured to receive a second optical signal having a second polarization different to the first polarization,
    wherein each of the first dispersion compensator and the second dispersion compensator comprises the dispersion compensator as claimed in claim 1.

11. The device as claimed in claim 1 wherein the processing module comprises a first optical phase shift module configured to apply a first phase shift to the converted component and/or direct component received from the polarization module, and
    the processing module further comprises a first optical coupler configured to receive the converted component and direct component, at least one of the converted component and direct component being phase shifted by the first phase shift,
    wherein the first optical phase shift module is configured to apply the first phase shift such that the first optical coupler outputs a first and second optical signal of equal power.

12. The device as claimed in claim 11 wherein the processing module comprises a second optical phase shift module configured to apply a second phase shift to the first and/or second optical signal received from the first optical coupler, and
    the processing module further comprises a second optical coupler configured to receive the first and/or second optical signal, at least one of the first and/or second optical signal being phase shifted by the second phase shift,
    wherein the second optical phase shift module is configured to apply the phase shift such that the coupler outputs one or more optical signal solely having said first and/or second polarization mode.

13. A method of dispersion compensation of a received optical signal, comprising:
    configuring a dispersion compensator comprising a plurality of optical dispersion compensator units, wherein each optical dispersion compensator unit comprises a plurality of delay elements,
    wherein configuring the dispersion compensator comprises selectively activating one or more of the optical dispersion compensator units,
    such that the dispersion compensator compensates for dispersion of the optical signal with the activated one or more optical dispersion compensator units;
    controlling a polarization of the received optical signal and outputting one or more optical signals to the dispersion compensator, wherein the one or more optical signals has a single polarization;
    wherein controlling the polarization of the received optical signal comprises receiving an optical input signal and converting a component having a first polarization mode into a converted component having a second, different, polarization mode; and
    combining the converted component with a direct component received with said second polarization mode, and generating an optical output signal solely having said second polarization mode.

14. The method as claimed in claim 13 wherein a said delay element applies a delay to a sub-band of the optical signal.

15. The method as claimed in claim 14 wherein the sub-bands of the plurality of delay elements overlap in frequency.

16. The method as claimed in claim 13 wherein the optical dispersion compensator unit applies a delay to the optical signal which varies linearly with frequency.

17. The method as claimed claim 13 wherein the optical dispersion compensator unit couples an optical bus to one or more of the delay elements, wherein the plurality of delay elements delay the optical signal.

18. The method as claimed in claim 13 wherein the dispersion compensator comprises a first switch associated with each optical dispersion compensator unit, wherein the first switch is controlled to couple the optical signal with the associated optical dispersion compensator unit to activate the optical dispersion compensator unit.

19. A computer program product, comprising instructions which, when executed on at least one processing circuit, cause the at least one processing circuit to carry out the method according to claim 13.

20. A controller configured to control a device arranged to receive an optical signal, wherein the device comprises a dispersion compensator comprising a plurality of optical dispersion compensator units, the controller is configured to control a selective activation of one or more of the optical dispersion compensator units, such that the activated one or more optical dispersion compensator units compensates for dispersion of the optical signal;

the device further comprising a polarization controller configured to output one or more optical signals to the dispersion compensator, wherein the or each optical signal has a single polarization;

wherein the polarization controller comprises a polarization module configured to receive an optical input signal and configured to convert a component having a first polarization mode into a converted component having a second, different, polarization mode; and wherein the device further comprises a processing module configured to combine the converted component with a direct component received with said second polarization mode, wherein the processing module is configured to generate an optical output signal solely having said second polarization mode.

* * * * *